Nov. 17, 1942.                F. P. WILLCOX                2,301,921
              RIGID, ADJUSTABLE, METALLIC, CAMERA STRUCTURE
                        Filed May 7, 1940          5 Sheets-Sheet 1

INVENTOR.
FREDERICK P. WILLCOX
BY
ATTORNEY.

Nov. 17, 1942.  F. P. WILLCOX  2,301,921

RIGID, ADJUSTABLE, METALLIC, CAMERA STRUCTURE

Filed May 7, 1940  5 Sheets-Sheet 2

INVENTOR.
FREDERICK P. WILLCOX
BY
ATTORNEY.

Nov. 17, 1942.    F. P. WILLCOX    2,301,921
RIGID, ADJUSTABLE, METALLIC, CAMERA STRUCTURE
Filed May 7, 1940    5 Sheets-Sheet 3

INVENTOR.
FREDERICK P. WILLCOX
ATTORNEY.

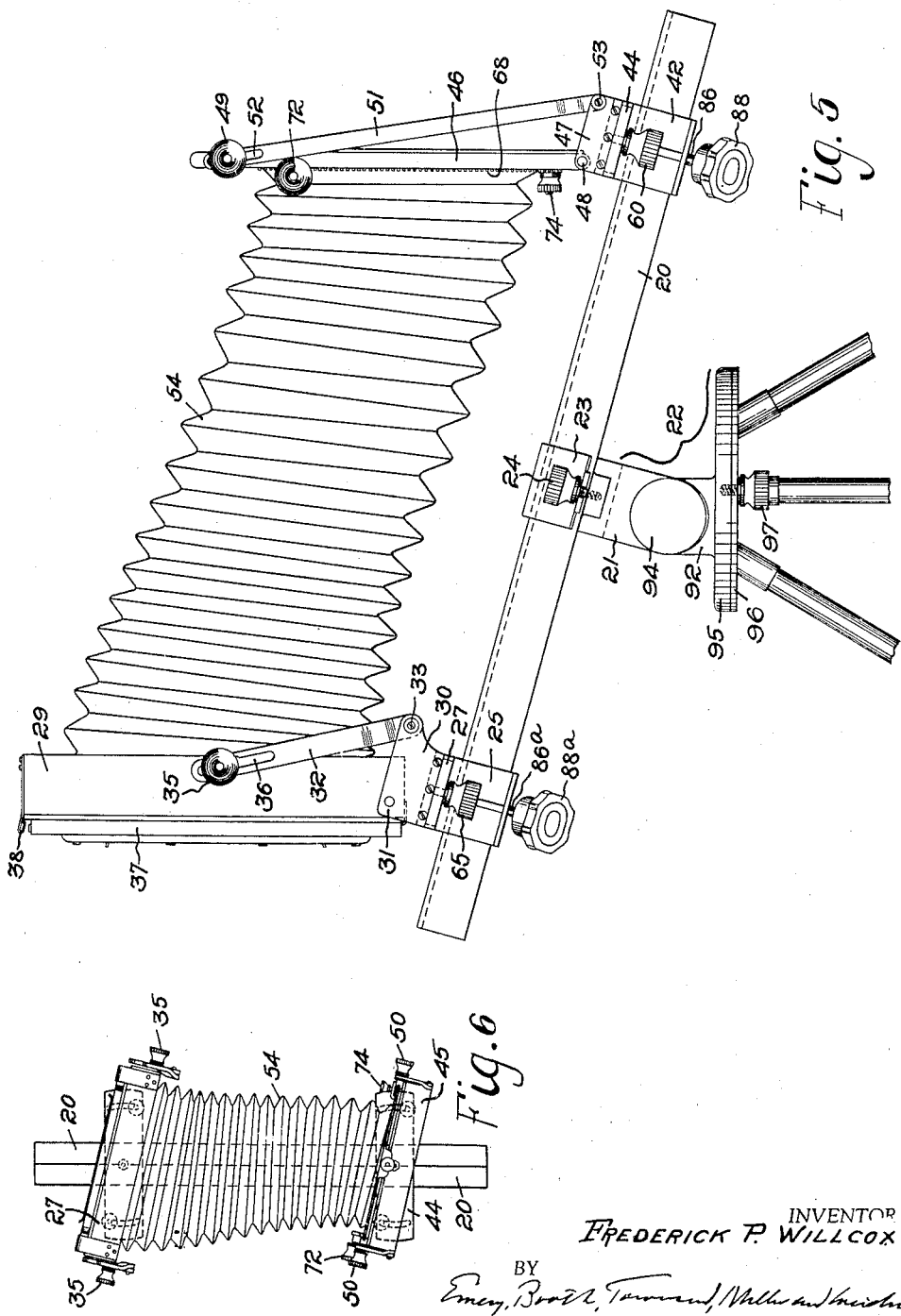

Patented Nov. 17, 1942

2,301,921

UNITED STATES PATENT OFFICE 2,301,921

RIGID, ADJUSTABLE, METALLIC CAMERA STRUCTURE

Frederick P. Willcox, San Francisco, Calif., assignor to The Folmer Graflex Corporation, Rochester, N. Y., a corporation of Delaware Application May 7, 1940, Serial No. 333,723

13 Claims. (Cl. 95—50)

This invention relates to rigid, adjustable, metallic, camera structures.

In order that the principle of the invention may be readily understood, I have disclosed a single embodiment thereof in the accompanying drawings, wherein—

Figure 4:
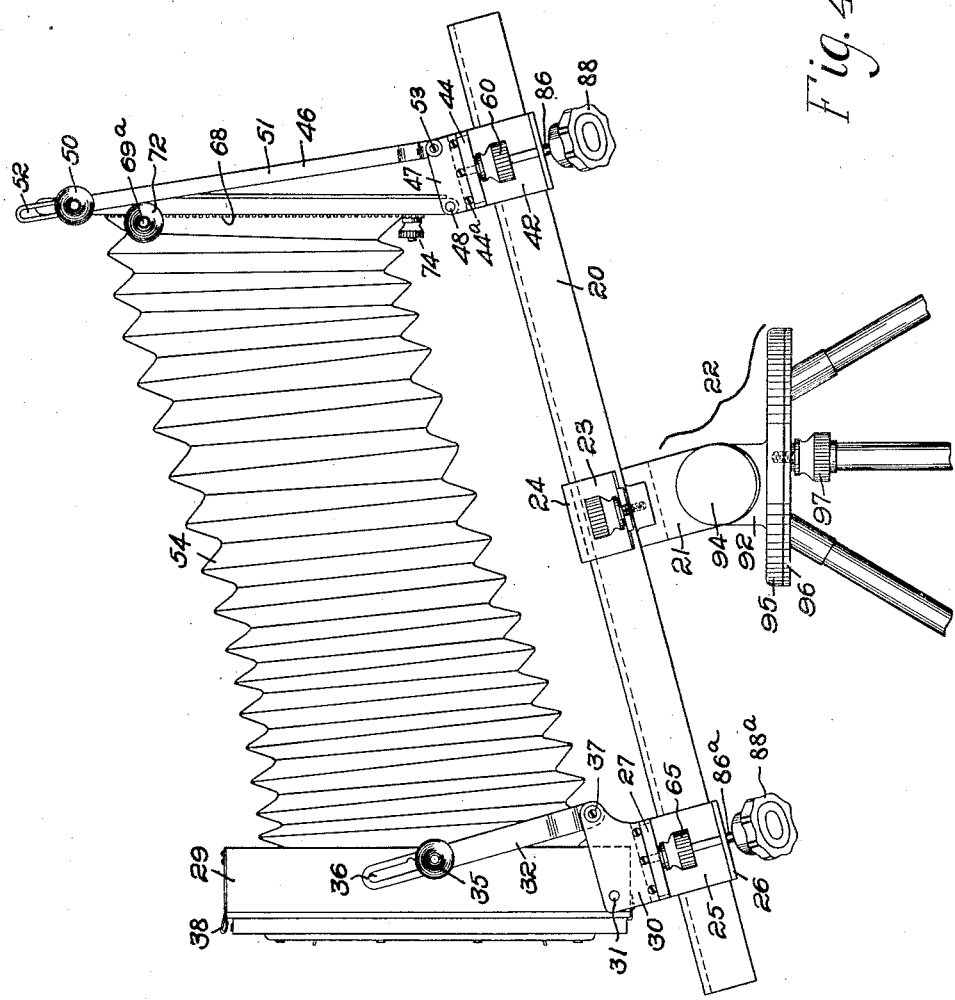
Fig. 4 is a side elevation of the camera with the camera bed tilted at an angle, the camera back and camera front also being tilted at an angle, thus providing an adjustment for photographing extremely high buildings or other objects, and at the same time correcting for perspective.

Fig. 5 is a side elevation similar to Fig. 4, excepting that the camera bed is tilted in the opposite direction and the camera front and back are tilted in a rearward direction, thus providing means for correcting perspective when photographing downward; and Fig. 6 is a top plan view on a much smaller scale, showing the use of the horizontal swings to correct for perspective in a horizontal direction.

There has long been a need for a photographic camera having a wide range of secure adjustments, constituting an exceedingly rigid assembly of parts, including the entire camera structure and support. There is particular need for such an organization or assembly for the making of three-color-separation negatives, since all three negatives must be identical, but my invention is of application in many other relations. Heretofore so far as I am aware, no photographic camera has been provided that could be used satisfactorily for three-color-separation work because lacking sufficient resistance when the extreme limits of the various adjustments were utilized.

An important object of the invention is to provide a camera with an extremely rigid base that will maintain camera alignment at all times. Other important objects of the invention are: (1) to provide a back swing in both vertical and horizontal directions, the structure being capable of being securely locked in place and having all the rigidity possessed of a camera back of the non-adjustable type; (2) to provide a camera front of extremely rigid character having great latitude in its vertical adjustment, and having means for locking the said front when such vertical adjustment is used to maintain absolute rigidity; (3) to provide a camera front having both vertical and horizontal swings and that can be rigidly locked in position; (4) to provide a camera with a tilting head or foot member for attachment to a tripod so that the camera bed may be tilted, enabling the user to obtain the full advantage of both the front and back swing, thus providing a camera of great versatility; (5) to provide a camera with both front and back focusing means and with means to maintain both the front and the back of the camera in perfect alignment regardless of the position of the front or back with respect to the camera bed; and (6) to provide a camera wherein the camera front may be brought very close to the camera back, thus making it possible to use extremely short focal length lenses. Still other objects of the invention will be evident from the following description.

I have in the accompanying drawings shown a single embodiment only of my invention, and while I will specifically describe the same, my invention is not necessarily limited thereto, the scope thereof being indicated by the appended claims.

Figure 1:
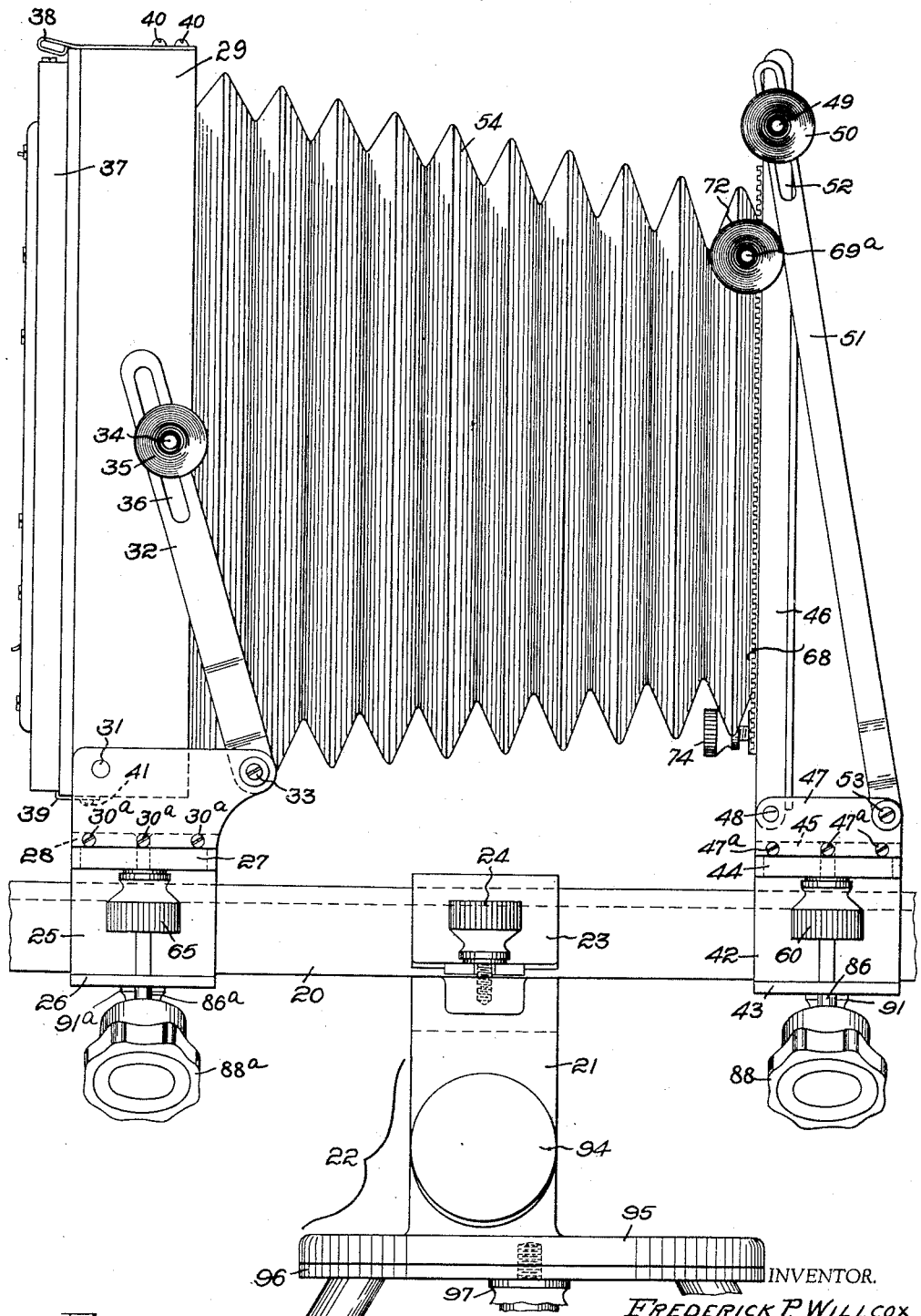
Fig. 1 is a side elevation showing the camera with the bellows partly extended and the camera track in the horizontal position.
Figure 2:
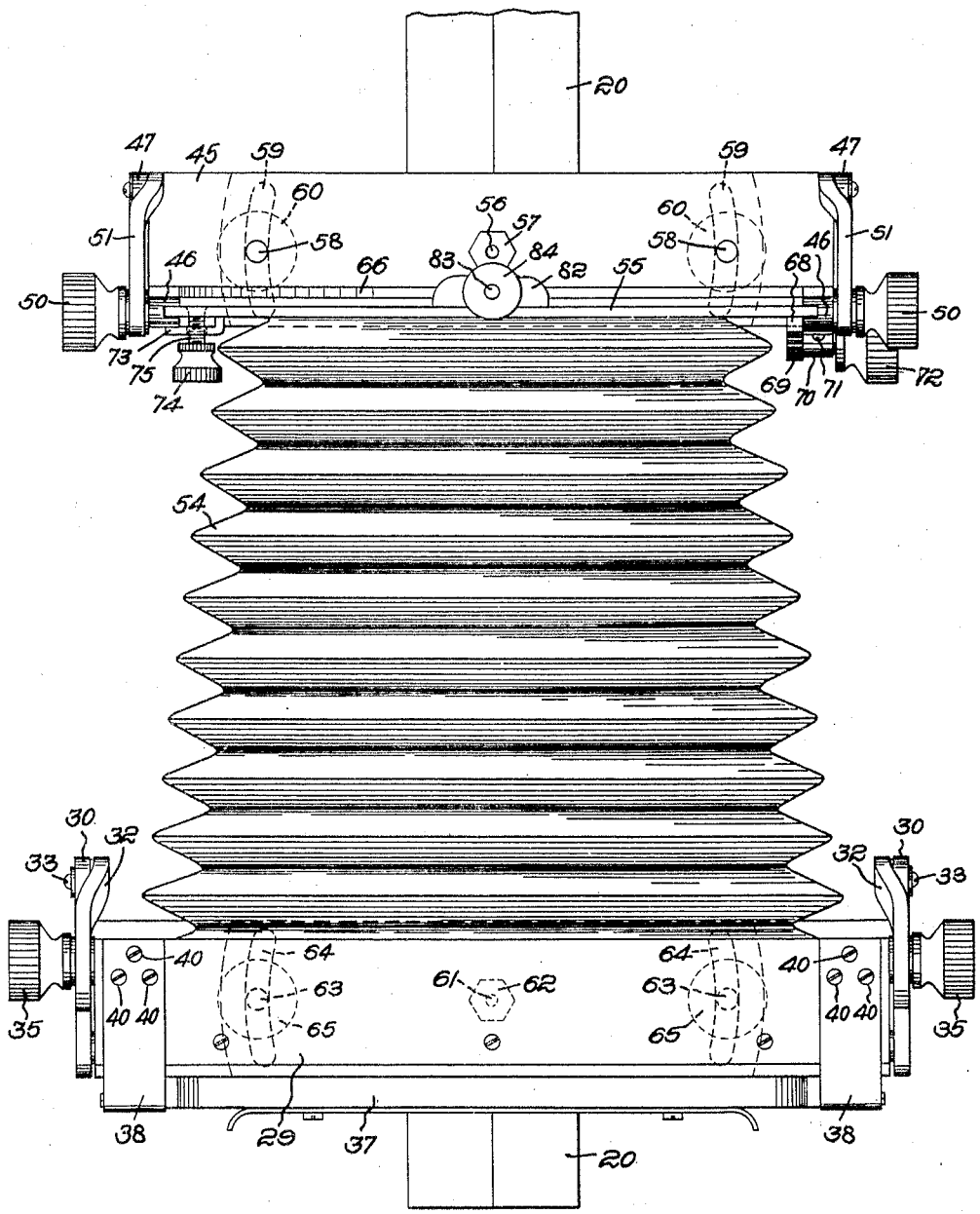
Fig. 2 is a top plan view of Fig. 1, showing the slotted construction provided for horizontal swings in both the camera front and the camera back.
Figure 3:
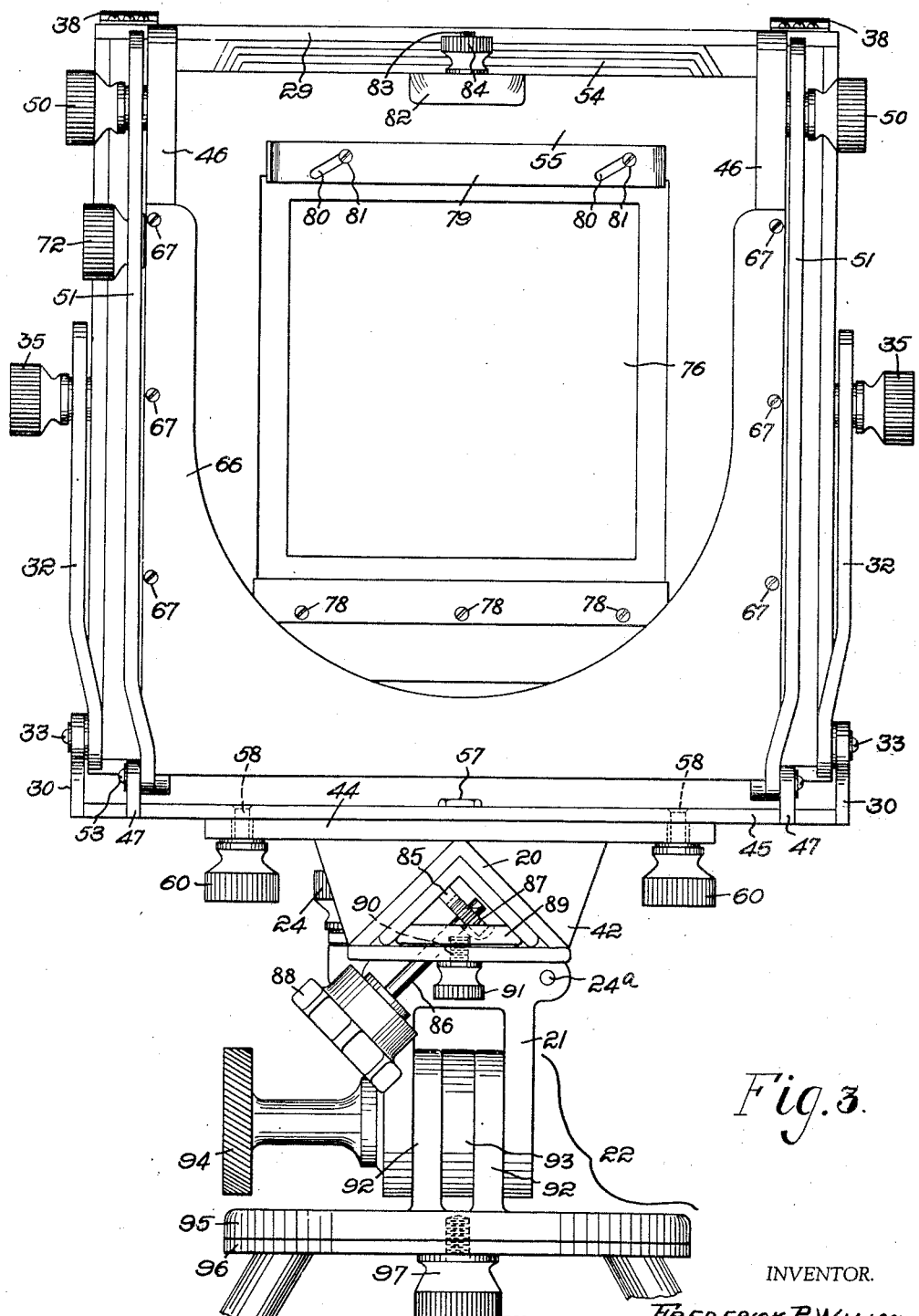
Fig. 3 is a front elevation of the camera and the camera tilting head.

Referring first more particularly to Figs. 1, 2 and 3, the camera bed itself is indicated at 20. It is an elongated, relatively thin but rigid, metallic piece or member of angular structure in cross section, being desirably but not necessarily of inverted V shape in cross section. The said bed piece 20, which may be of any suitable metal, such, for example, as steel, bronze, aluminum or some suitable alloy, is clamped to a swinging, bifurcated head member 21, shown most clearly in Figs. 1 and 3, said head member 21 constituting a part of the tiltable tripod head designated as an entirety at 22 in the several figures. The said bed piece 20 is clamped to the swinging head member 21 by means of a clamping member 23, which is also, in this embodiment of my invention, of inverted V-shape, so as to fit exactly onto said bed piece 20, the said member 23 being held adjustably in place by a knurled screw 24, and being pivoted on a pin 24a, shown in Fig. 3.

Adjustable lengthwise along the camera bed piece 20 is a saddle member 25, also of inverted V shape and also fitting exactly onto said bed piece 20, it being held to the camera bed piece 20 by a plate 26. The said saddle member 25 has attached thereto a bolster plate 27 by means more fully described hereinafter, and to the said bolster plate 27 is attached the camera box-supporting member indicated in dotted lines at 28. The camera box itself is indicated in the several figures at 29, and it is shown as pivoted at each side thereof to an end plate 30 of the said supporting member 28 by means of a pin 31. The said camera box 29 is additionally held in place by two movable braces 32, each attached to the adjacent end plate 30 by means of a shoulder screw 33, as indicated in Fig. 2. Each end plate 30 is attached to the supporting member by screws 30a, 30a. Attached to the camera box 29 at each side is a threaded stud 34 having a clamping nut 35. Each movable brace 32 is provided with an elongated, longitudinal slot 36, to permit the camera box 29 to be rotated about the pins 31 as a horizontal axis when the nuts 35 are loosened by turning them in a contraclockwise direction. The camera box 29 can then be moved to any position within the limits of the said slots 36 which ride upon the studs 34, and the said box 29 may then be rigidly clamped in place by the nuts 35. The camera box 29 is provided with a usual adapter back 37 held in place by means of a spring 38 and a clip 39, the former being held to the camera box by screws 40, 40, and the latter being held to the camera box by a screw 41, shown in dotted lines in Fig. 1.

The camera front includes a saddle 42 which, in the present embodiment of the invention, is also of inverted V shape in cross section, for the same purpose and fitting in the same manner as the clamping member 23 and the saddle member 25, it being understood that if the camera bed piece 20 is in cross section of some other shape than V shape, the clamping member 23, the saddle member 25 and the saddle 42 are all correspondingly shaped, so as to be tightly fitted thereto. The said saddle 42 is held to the said camera bed piece 20 by means of a plate 43 and a bolster plate 44, and attached to the latter by means more fully described hereinafter is a camera front plate 45, best shown in dotted lines in Fig. 1. The said camera front plate is provided with opposite side rails 46 and the camera front plate 45 is provided with opposite end plates 47 each attached to the said front plate 45 by means of screws 47a, 47a, and to which front plate 45 are attached the said camera front side rails 46 by means of transversely extending pins 48. The said side rails 46 are each provided with a threaded stud 49 having a locking nut 50. The said camera front is also provided with opposite front brace bars 51 each having a slot 52 riding on a stud 49. The camera-front side rails 46 can be rotated about the axis of the horizontal pins 48 within the limits of the slots 52 and can then be clamped rigidly in place by means of clamping nuts 50, 50. Each front brace bar 51 is pivoted to the adjacent end plate 47 by means of a shoulder screw 53.

In Figs. 1 and 2 there is shown the camera bellows 54 partly extended. It is provided with the usual bellows frame for attaching it to the camera box 29. The said bellows frame is not illustrated in detail inasmuch as its structure is so well known as not to require further illustration or description. The front end of the said bellows 54 is also attached to the sliding front member 55 in the usual manner not herein necessary to disclose more fully.

In Fig. 2 is shown the camera front in its central or what may be termed its neutral position. The front bolster plate 44 (itself shown in Fig. 1) is provided with a threaded stud 56 passing through the camera front plate 45. A nut 57 is attached to said stud 56 and holds the camera front plate 45 to the bolster plate 44. The camera front plate 45 has attached thereto studs 58, 58, passing through slots 59, 59 of the said bolster plate 44, the said slots being indicated in dotted lines in Fig. 2. Threaded to the studs 58, 58 are clamp nuts 60, 60, shown in full lines in Figs. 1 and 3 and in dotted lines in Fig. 2. The described structure permits the camera front plate 45 to be rotated about the stud 56 within the limit of the slots 59, 59, and the said front plate 45 can then be clamped into place by means of the clamp nuts 60, 60.

The camera box end of the camera structure is similarly constituted. To the bolster plate 27, as best shown in Fig. 1, is attached a stud 61, shown in dotted lines in Fig. 2 as passing through a hole in the camera box-supporting member 28 of Fig. 1. The said camera box-supporting member 28 is held to the bolster plate 27 by means of a nut 62, shown in dotted lines in Fig. 2. To the camera box-supporting plate 28 are attached studs 63, 63, shown in dotted lines in Fig. 2, and which pass through the slots 64, 64 in the bolster plate 27, as shown in dotted lines in said figure. Attached to the studs 63, 63 are clamp nuts 65, 65, shown in full lines in Figs. 1, 4 and 6, and in dotted lines in Fig. 2.

Fig. 6 represents in top plan view the camera with its front rotated or turned in a clockwise direction viewing said figures. The camera box 29 is also rotated or turned in a clockwise direction, thus giving a maximum extent of correction for perspective on a horizontal plane. It is to be understood that the camera front and the camera box can, however, be so positioned that the swing is in the opposite direction, thus correcting for perspective to the left of the camera as one faces the lens thereof.

In Fig. 3, which is a front elevation of the camera structure, the two side rails 46, 46 are shown as tied or united together by means of a U-shaped member 66, held to said side rails by means of screws 67, 67. Said side rails 46, 46 are provided with grooves, both of which are shown in Fig. 2 and in which the front bellows frame 55 is free to slide vertically.

Attached to the front bellows plate or front bellows member 55 is a rack 68, most clearly shown in Figs. 1 and 2. Meshing with the said rack is a pinion 69 having a shaft 69a, shown in Fig. 1, which passes through a bearing 70 attached to one of the side rails 46 by screws 71, 71, as shown in Fig. 2. To the outer end of the pinion shaft 69a is attached a knob 72, shown in Figs. 2 and 3. It will be understood that when the knob 72 is turned in a clockwise direction, the bellows frame 55 will be raised, due to the action of the pinion 69 meshing with rack 68, and when the knob 72 is turned in a clockwise direction, the bellows frame 55 will be lowered.

In order to clamp the said bellows frame 55 and thus prevent movement in a vertical direction, there is provided a clamp 73, shown in Fig. 2 as engaging a side rail 46, when the knurled nut 74 is turned in a clockwise direction on the stud 75 attached to the bellows frame 55. Thus, there is provided by the foregoing construction means for positioning the bellows frame 55 in a vertical direction as well as means to lock securely the said bellows frame 55 in any selected position of adjustment.

Again referring to Fig. 3, the bellows frame 55 is provided with an opening 76 in which the usual lensboard is mounted. For that purpose the bellows frame 55 is provided with the usual lensboard retaining strip 77 held to the bellows frame 55 by screws 78, 78, and the usual slide lock 79 provided with angular slots 80, 80, receiving and riding on screws 81, 81. Upon the bellows frame 55, there is provided a boss 82 carrying a stud 83 and a nut 84, the purpose of such structure being to provide means for attaching a collapsible sunshade for the lens, such shade not being itself here shown.

The camera bed piece 20 is provided with a rack 85 extending the full length of the bed 20 and securely attached thereto. The said rack 85 is metallic as are essentially all the members or parts of the entire structure herein shown and described. Passing through the bed plate 43, as shown in Fig. 1, is a shaft 86 to which is attached a pinion 87, and on the opposite end of said shaft 86 is fast a knob 88. Riding on the inner face of the bed piece 20 is a clamping shoe 89 also metallic, and threaded into the plate 43 is a stud 90 having a knurled knob 91.

When the said knurled knob 91 is turned in a clockwise direction, the clamping shoe 89 is forced into engagement with the inner face of the bed piece 20, thus locking the camera front rigidly to the said bed piece 20. When the said knurled knob 91 is turned in a contraclockwise direction, thus releasing the clamping shoe 89, the camera front can be moved along the said bed piece 20, by the act of turning the knob 88, which in turn rotates the pinion 87 meshing with the rack 85.

The camera box 29 is also provided with a like structure and is operated in a like manner. That is to say, the structure of the bed saddle with respect to its manipulating or adjusting mechanism is precisely the same in structure as that just described for the camera front and for that purpose it has a pinion (not shown, but similar to pinion 87) meshing with rack 85, and a shaft 86a and knob 88a, shown in Figs. 1, 4, and 5. A clamp screw is also provided and a clamping stud and knurled nut similar to the parts 89, 90 and 91 already described with respect to the camera front.

The lower end of the tilting head member 21 is of inverted U shape and rides over two upwardly extending bosses 92, 92, between which is a locking plate 93.

Passing through one leg of the tilting head member or bracket 21, as shown in Fig. 1, and through an upstanding boss 92, is a threaded stud integral with the clamping nut 94, and it in turn is threaded into the nut 93. This structure provides means for clamping the tilting head member 21 to the tilting head base 95, thus allowing the camera bed to be swung at an angle in an upright plane, as indicated in Figs. 4 and 5. The said tilting head is attached to a tripod in the usual manner. The tripod head is represented at 96 in the several figures, and has a tripod clamping screw 97 for attaching the tripod head to the body of the tripod.

It is to be understood that the tilting top, generally designated at 22, is a structural or component part of the camera assembly and not of the tripod itself, as any standard tripod can be used with the herein described camera equally well.

It will be understood from the foregoing description that the camera herein disclosed is readily adaptable for use in many different types of photography where corrections must be made. The camera is exceedingly rigid into whatever position it may be adjusted.

The structure herein disclosed is such that the entire camera including all the parts thereof may be and are manufactured of metal, excepting, of course, the bellows and the lens, and yet it is no heavier than the conventional wooden camera taking a picture of similar size. It will be noted from the illustration and description that the usual collapsible camera bed has been eliminated, and that in the place thereof I have substituted a metallic piece, preferably angular in cross section, and which while relatively thin is completely rigid. It may be carried in the carrying case which need be no larger than the case required for the usual wooden camera taking the same size picture. The camera front and the back are closed up onto the tilting tripod head, leaving the ends of the said camera bed piece 20 projecting on either side. A suitable camera support is readily built into the carrying case for the camera, and the plate holders and other accessories are in practice carried in compartments underlying the ends of the camera bed structure.

Having thus described one illustrative embodiment of my invention, it is to be understood that although specific terms are employed, they are used in a generic and descriptive sense and not for purposes of limitation, the scope of the invention being set forth in the following claims.

I claim:

1. A photographic camera bed for receiving and supporting a camera back and a camera front, said camera bed being an elongated, relatively narrow, metallic piece of inverted V-shape when in operative position, said camera back and said camera front each having at its lower end a saddle of inverted V-shape, so as to be received upon the said camera bed, clamping shoes received within the camera bed, and operating screws attached to the saddle means for forcing said clamping shoes upwardly against the inner walls of said camera bed, without distortion of said parts, and means for moving said camera back and said camera front lengthwise along said bed piece.

2. A camera structure including, in combination, and thereby providing a camera structure rigid throughout with front and back members having a common support which is itself adjustable, which combination includes the following co-acting elements, viz, a metallic camera bed consisting of an elongated, relatively narrow piece of an inverted V-shape in cross section, a camera back or box and a camera front, separate saddle members of similar inverted V-shape, receiving and supporting said back and said front respectively and themselves received upon the upper face of said camera bed, and means for moving said saddle members along said camera bed and for clamping said saddle members in selected positions of adjustment on said camera bed, said means including a clamping shoe for each of said saddle members, said clamping shoes being received within the camera bed, and operating screws attached to the saddle means for forcing said clamping shoes upwardly against the inner walls of said camera bed without distortion of said parts, a rack secured to the under face of said camera bed, and a pinion meshing with said rack and having a shaft supported in the saddle means and accessible for manual manipulation.

3. A camera structure including in combination, a metallic camera bed consisting of an elongated, relatively narrow, metallic piece of an inverted V-shape in cross section, a camera back or box and a camera front, separate saddle members of similar inverted V-shape, receiving and supporting said back and said front respectively and themselves received upon the upper face of said camera bed, and means for moving said saddle members along said camera bed and for clamping said saddle members in selected positions of adjustment on said camera bed, said means including a clamping shoe for each of said saddle members, said clamping shoes being received within the camera bed, and operating screws attached to the saddle means for forcing said clamping shoes upwardly against the inner walls of said camera bed without distortion of said parts, a rack secured to the under face of said camera bed, a pinion meshing with said rack and having a shaft supported in the saddle means and accessible for manual manipulation, a clamping member of a cross section adapting it to fit upon said camera bed between the camera back and camera front, and a tilting top for a tripod head having two parts tiltable with respect to each other, one of said parts being clamped to the last mentioned clamping member and the other of said parts having means for attaching the same to a tripod head.

4. A camera structure including, in combination, a metallic camera bed consisting of an elongated, relatively narrow piece of an inverted V-shape in cross section, a camera back or box and a camera front, separate saddle members of similar inverted V-shape receiving and supporting said back and said front respectively and themselves received upon the upper face of said camera bed, and means for moving said saddle members along said camera bed and for clamping said saddle members in selected positions of adjustment on said camera bed, said means including a clamping shoe for each of said saddle members, said clamping shoes being received within the camera bed, and operating screws attached to the saddle means for forcing said clamping shoes upwardly against the inner walls of said camera bed without distortion of said parts, a rack secured to the under face of said camera bed, a pinion meshing with said rack and having a shaft supported in the saddle means and accessible for manual manipulation, a clamping member of a cross section adapting it to fit upon said camera bed between the camera back and camera front, and a tilting top for a tripod head having two parts tiltable with respect to each other, one of said parts being clamped to said last mentioned clamping member and having spaced, depending formations 21, and the other of said parts having spaced, upstanding formations 92 extending from a tilting head base 95, and a clamping bolt passing through the formations 21 and 92 and adapted to secure the same in desired position of relative adjustment.

5. A camera structure including, in combination, and thereby providing a camera structure rigid throughout with front and back members having a common support which is itself adjustable, which combination includes the following co-acting elements, viz; a metallic camera bed consisting of an elongated, relatively narrow piece of an inverted V-shape in cross section; said camera structure having a back member and a front member, at least one of said members having a separate saddle member of similar inverted V-shape receiving and supporting the same, and itself received upon the upper face of said camera bed, and means for moving said saddle member along said camera bed and for clamping said saddle member in selected positions of adjustment on said camera bed, said means including a clamping shoe for said saddle member and received within the camera bed, operating screws attached to the saddle means for forcing said clamping shoes upwardly against the inner walls of said camera bed without distortion of said parts, a rack secured to the under face of said camera bed, and a pinion meshing with said rack and having a shaft supported in the saddle means and accessible for manual manipulation.

6. A camera structure including in combination, and thereby providing a camera structure rigid throughout with adjustable front and back members having a common support which is itself adjustable, which combination includes the following co-acting elements, viz; a metallic camera bed consisting of an elongated, relatively narrow, metallic piece of an inverted V-shape in cross section; said camera structure having a front member and a back member, at least one of said members having a separate saddle member of similar inverted V-shape receiving and supporting the same and itself received upon the upper face of said camera, and means for moving said saddle member along said camera bed and for clamping said saddle member in selected positions of adjustment on said camera bed, said means including a clamping shoe for said saddle member and received within the camera bed, operating screws attached to the saddle means for forcing said clamping shoes upwardly against the inner walls of said camera bed without distortion of said parts, a rack secured to the under face of said camera bed, a pinion meshing with said rack and having a shaft supported in the saddle means and accessible for manual manipulation, a clamping member of a cross section adapting it to fit upon said camera bed between the front and back members thereof, and a tilting top for a tripod head having two parts tiltable with respect to each other, one of said parts being clamped to the last mentioned clamping member, and the other of said parts having means for attaching the same to a tripod head.

7. A camera structure including, in combination, and thereby providing a camera structure rigid throughout with adjustable front and back members having a common support which is itself adjustable, which combination includes the following co-acting elements, viz; a metallic camera bed consisting of an elongated, relatively narrow piece of an inverted V-shape in cross section, said camera structure having a back member and a front member, at least one of said members having a separate saddle member of similar inverted V-shape receiving and supporting the same and itself received upon the upper face of said camera bed, and means for moving said saddle member along said bed and for clamping said saddle member in selected positions of adjustment on said camera bed, said means including a clamping shoe in said saddle member which is received within the camera bed, operating screws attached to the saddle means for forcing said clamping shoes upwardly against the inner walls of said camera bed without distortion of said parts, a rack secured to the under face of said camera bed, a pinion meshing with said rack and having a shaft supported in the saddle means and accessible for manual manipulation, a clamping member of a cross section adapting it to fit upon said camera bed between the front and back members thereof, and a tilting top for a tripod head having two parts tiltable with respect to each other, one of said parts being clamped to the last mentioned clamping member and having spaced, depending formations 21, and the other of said parts having spaced, upstanding formations 92 extending from the tilting head base 95, and a clamping bolt passing through the said formations 91 and 92 and adapted to secure the same in desired positions of relative adjustment.

8. A camera structure in accordance with claim 1, but wherein there is a tripod head having a member mounted upon a transverse pivot carried by said tripod head, and means for attaching said clamping member to said pivotally mounted member, the construction thereof being such that the said bed piece may be tilted in either direction in an upright plane.

9. A camera structure in accordance with claim 1, but wherein there are means for swinging each upright front or back member with relation to its saddle member toward and from the other upright front or back member, and means for swinging the said upright members in directions transverse to the position of said bed piece.

10. A camera structure in accordance with claim 1, but wherein there are means for swinging each upright front or back member in directions toward and from the other front or back member, means for swinging each such upright member with relation to its saddle in directions transverse to the position of said bed piece, and means for rigidly securing each such upright member in each of said positions.

11. A camera structure in accordance with claim 1, but wherein, in conjunction with each saddle, there is a bolster plate, opposite end plates attached to such bolster plate, an upright front or back member being pivoted to the said end plates, means for tilting each such upright member upon its pivot both toward and from the other upright front or back member, and means for tilting each upright front or back member upon its saddle and its bolster plate in directions transverse to the position occupied by the metallic bed piece.

12. A camera structure in accordance with claim 1, but wherein, in conjunction with each saddle, there is a bolster plate having a member pivoted thereto, opposite end plates attached to such bolster member pivoted to said plate, each front or back upright member being pivoted to its end plates, means for tilting each such front or back upright member upon its pivot both toward and from the other such upright member, means for also tilting each such upright front or back member in directions transverse to the position occupied by said metallic bed piece, a tripod head attached to and supporting the bed piece, and means for tilting the bed piece either up or down while supported by said tripod head.

13. A camera structure in accordance with claim 1, but wherein said camera front and said camera back respectively have parts movable with respect to each other, whereby said camera front and camera back may be aligned with each other, and also in a vertical direction with respect to the article being photographed irrespective of the tilting of the camera bed and a central support whereon said camera bed is suitably mounted.

FREDERICK P. WILLCOX.